Figure 1:
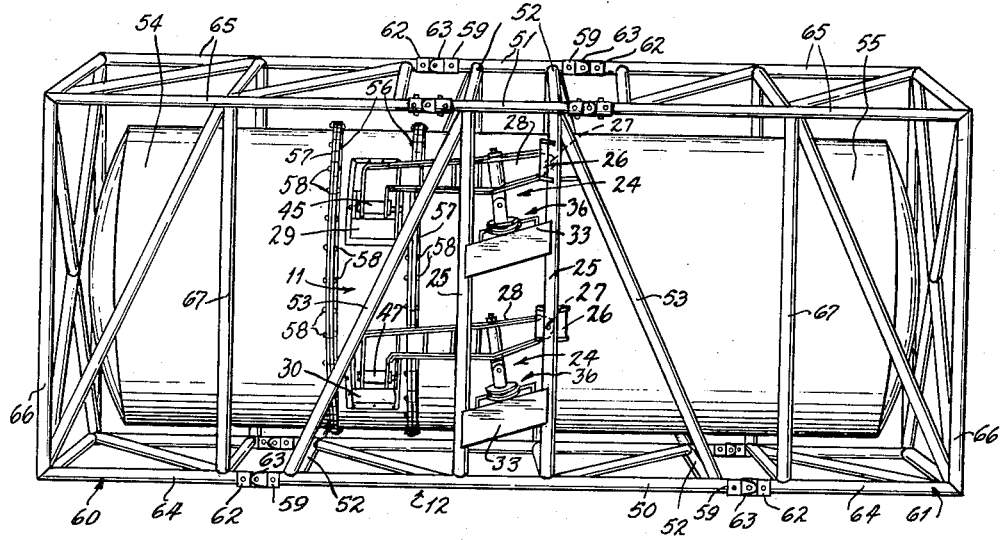

March 15, 1960 W. A. SIMMONS ET AL 2,928,535
SHOCK-RESISTING SUPPORT FOR STORING AND SHIPPING ENGINES AND
THE LIKE EQUIPMENT CONTAINING DESTRUCTIBLE COMPONENTS
Filed July 14, 1953
2 Sheets-Sheet 1

INVENTORS.
WALTER A. SIMMONS
THOMAS P. MULGRAVE
BY
ATTORNEYS

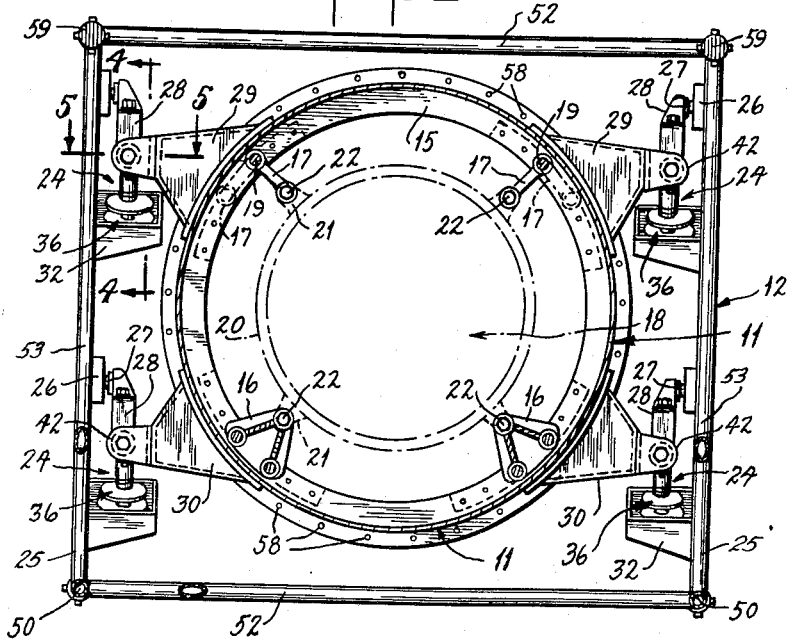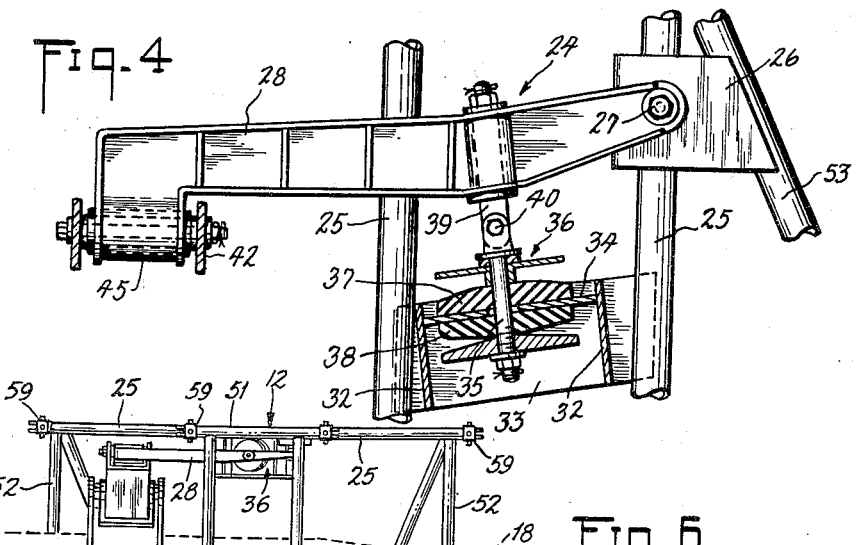

United States Patent Office 2,928,535
Patented Mar. 15, 1960

2,928,535

SHOCK-RESISTING SUPPORT FOR STORING AND SHIPPING ENGINES AND THE LIKE EQUIPMENT CONTAINING DESTRUCTIBLE COMPONENTS

Walter A. Simmons, Wenonah, N.J., and Thomas P. Mulgrave, Drexel Hill, Pa.

Application July 14, 1953, Serial No. 368,021

7 Claims. (Cl. 206—46)

(Granted under Title 35, U.S. Code (1952), sec. 266)

The invention herein described may be manufactured and used by or for the Government of the United States of America for governmental purposes without the payment of any royalties thereon or therefor.

This invention pertains to the art of shipping and storing engines and the like equipment containing components that may be injured by shock impact. The invention comprises a support that holds the engine in its normal upright position, in which position the engine may be stored, or shipped from place to place, and is protected against the danger of it becoming damaged during the normal and usual handling of shipping and storing.

The support of the invention comprises an endless band that fits around the engine. The engine is positioned within the band, which is located lengthwise of the engine at or near the transverse plane through the center of gravity of the engine. Shackles internally of the band, and spaced apart around the band, engage the engine and hold it rigidly suspended internally of the band with the lengthwise axis of gravity of the engine located at or near the center of the band.

The band is supported by a base, which is adapted to rest on a flat surface, such as the deck of a ship or a warehouse, for example. The mount of the band on the base comprises a set of shock absorbers embodying shock mounts distributed spaced apart around the band and exteriorly thereof, the shock mounts being located to yield to such loads of the engine weight against the base as occur in the normal handling of the engine for shipping or storing. The engine is lifted by lifting apparatus engaging the base. Any shock from the weight of the engine being lifted is transmitted to the base through the band, and is absorbed by the shock mounts. This reduces the reactance shock that is transmitted to delicate components of the engine, and inhibits resultant stresses such as may injure engine components.

A container encloses the engine supported by the base, and comprises a can for each end that fits around the engine, each can being secured at its rim to the band. The entire engine is enclosed and sealed in the container, and thus is protected for storage and transportation until the engine is to be used.

The base is adapted to serve also as a protective crate for the engine enclosed within the container. A frame structure is attached to the base at each of opposite ends of the engine, to constitute an enveloping frame structure that receives the blow of any impact that may occur in normal handling for shipping or storing.

Figure 2:
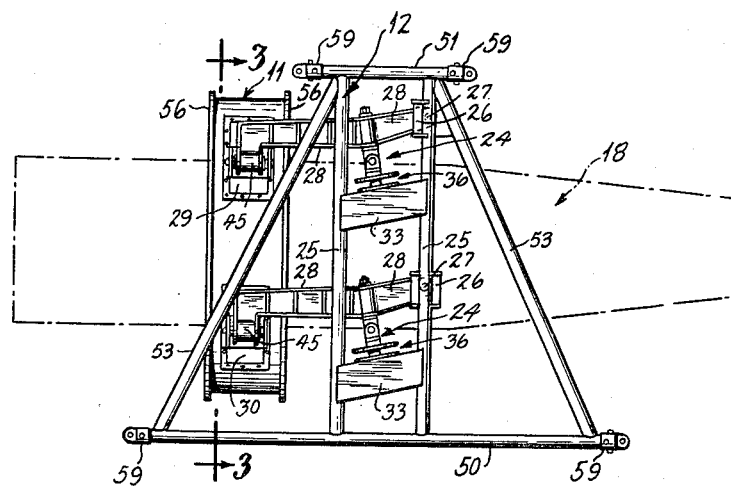
Figure 3:
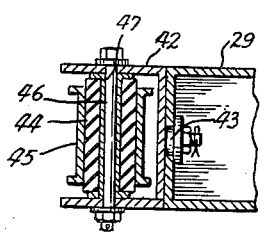

For a fuller understanding of the principles of the invention, and a disclosure of one practical embodiment thereof, attention is now directed to the drawing, in which Fig. 1 is an oblique view of the engine support of the present invention in use, taken from one side, Fig. 2 is a side elevation of the engine support of Fig. 1 at a different stage of its use, Fig. 3 is a cross-sectional elevation, taken on line 3—3 of Fig. 2, Fig. 4 is a cross-sectional detail, taken on line 4—4 of Fig. 3, and Fig. 5 is a cross-sectional detail, taken on line 5—5 of Fig. 3.

Fig. 6 is a bottom plan view of the engine support of Fig. 2.

The engine support of the disclosure comprises the band 11, Figs. 1, 2 and 3, which is carried by the base 12.

The band 11 as disclosed is circular, and constitutes a cylinder of limited length. Annular reinforcing rib 15 inside the band 11 carries the fixed shackles 16, Fig. 3, and movable shackles 17, to which the engine 18 inside the band is secured.

Engine 18, in the disclosed example is a jet engine of well-known structure. Jet engine 18 is elongated as indicated in Fig. 2, is generally cylindrical, and commonly it comprises annular reinforcing bands or flanges 20 which are distributed along its length in accordance with established design of the engine, the bands 20 comprising lugs 21 distributed circumferentially, by means of which the engine is mounted in the vehicle, of which the engine is the power plant. The shackles 16 and 17 are arranged circumferentially of the band 11 in position each to engage a lug 21 of a band 20 of the engine.

Each of the movable shackles 17 pivots on a bolt 19, and thereby is retractable to the dotted-line position shown in Fig. 3, where it is out of the way when the engine is inserted into band 11. Engine 18 is first secured to the fixed shackles 16, by means of fasteners constituting a bolt 22 through an eye thereof and also through a lug 21 of flange 20. Movable shackles 17 then are swung into position for engagement with other of the lugs 21, and are secured thereto by means of fasteners constituting a bolt 22 for each shackle through an eye thereof and also through a lug 21 of flange 20. Bolts 22, and their shackles 16 and 17 with band 11, thus define a plane which may be positioned normal to the axis of gravity of engine 18 and located at or near the center of gravity thereof.

For attaching engine 18 to the band 11, a reinforcing band or flange 20 of the engine is selected which is positioned lengthwise of the engine at or near the transverse plane that intersects the longitudinal axis of gravity of the engine at or near its center of gravity. Shackles 16 and 17 hold engine 18 securely positioned at or near the center of band 11, and approximately coaxially therewith. Thus, engine 18 and band 11 attached thereto constitute a rigid structure in which any diameter of the band approximates intersection with the axis of gravity of the engine at or near its center of gravity.

The mount for the band and engine assembly 11, 18 on base 12 comprises a plurality of shock absorbers 24 positioned on respective opposite sides of the band and distributed around the band in spaced-apart relationship.

Base 12 comprises a framework of upright stress members or posts 25 and 53 to which the brackets or gusset plates 26 are secured, each gusset plate 26 comprising a pivot pin 27 at one end of a torque arm 28, and on which the torque arm may swing up and down in a vertical plane. Band 11 comprises the brackets 29 above the axis of the band, and the brackets 30 symmetrically below the axis of the band, the several brackets 29 and 30 projecting laterally away from band 11 on opposite sides thereof, each into position for engagement with a torque arm 28 at its end remote from the pivot 27, and each bracket 29 and 30 being secured to its corresponding torque arm.

It will be observed that the torque arms 28 are in sets, each of the torque arms extending alongside the engine in the same direction away from its pivot 27 with reference to the lengthwise axis of the engine, the two torque arms of a set being on respective opposite sides of the engine, there being one set of torque arms above, and another set below the axis of the engine.

At a point between its ends, each torque arm 28 bears on to a bracket 32. Gusset plates 33 are secured rigidly to upright posts 25 of base 12, and each holds a bracket 32 in position for engagement by a torque arm 28. Bracket 32 comprises the abutment plate 34, Fig. 4, through which the pin 35 of a shock mount 36 projects, the buffer pads 37 and 38 of the shock mount bearing against abutment plate 34 respectively above it and below it. Torque arm 28 carries the pin or bolt 39 which is secured pivotally at 40 to pin 35 of shock mount 36.

Any shock load from the weight of the motor 18 being lifted or lowered is absorbed by the buffer pads 37 and 38 of the several shock absorbers 24.

Each torque arm 28 is secured to its bracket 29 or 30 of band 11 by means of the structure shown in detail in Figs. 4 and 5.

Clevis 42 is secured to bracket 29, Fig. 5, by means of pin 43, and in the case of brackets 30 the clevises 42 are secured in the same manner by means of pins 43. Cylindrical buffer pad 44 is contained in housing 45 at the end of torque arm 28 remote from the pivot pin 27, the axis of buffer pad 44 being oriented parallel with the axis of band 11. Bolt 46 extends through buffer pad 44 and is supported by clevis 42, bushing 47 being inserted between bolt 46 and the rubber or like material of pad 44.

Any shock load of the mass of engine 18 being rotated on a transverse axis through its axis of gravity is absorbed by buffer pads 44. Movement in any direction of the mass of engine 18 relative to the base 12 under shock impact tends to rotate each of the several bearings of buffer pads 44 on an axis transversely through its axis. The pin 43 comprises a pivotal mount that permits such limited rotation.

As seen in Fig. 2, base 12 comprises a framework of elongated stress members that are secured to each other rigidly by any suitable means, either end-to-end or end-to-member. At each end of base 12, a set of transverse stress members comprise lateral top and bottom members 52, and the upright members 53 at each side, secured to each other end-to-end to constitute top and bottom corners on each side. See Fig. 3. Lengthwise stress members 50 and 51, bottom and top, are secured at or near their opposite ends to the respective end sets of members 52 and 53 at their corners, top and bottom respectively. The lengthwise stress members 50 at the bottom of base 12, with the transverse stress members 52 at the bottom, provide extended area of support for the base 12 and its load.

Upright stress members or posts 25, secured at their opposite ends to respective lengthwise stress members 50 and 51, bottom and top, provide added strength to the base, and in addition serve also to anchor the several shock absorbers 24 located in desired positions of base 12 with reference to band 11.

Engine 18 is adapted to be enclosed in a container which preferably is sealed, and which may include a suitable air-conditioning apparatus if desired, to maintain the atmosphere within the container within predetermined ranges of temperature and humidity. This container comprises the cans 54 and 55, Fig. 1, which fit over the engine 18 at its respective opposite ends.

The cylinder of band 11 is provided with flanges 56, Fig. 2, at its respective opposite ends, and each can 54 and 55 is provided with an annular flange 57 at the rim of its open end, which fits against the corresponding flange 56 of band 11. Each can 54 and 55 is secured to band 11 by bolts 58 through the flanges 56 and 57, bolts 58 being distributed around the circumference of the flanges as seen in Fig. 1.

Engine 18 is supported by base 12 as seen in Fig. 2, and thereafter the cans 54 and 55 are secured to band 11 in the manner described to enclose engine 18 in its container as seen in Fig. 1. The enclosed engine 18 is now crated for handling to ship it or store it. To constitute the crate, a framework is attached to base 12 at its opposite ends, the framework and base as a continuous structure constituting the crate. The added framework of the crate consists of framework elements 60 and 61 at respective opposite ends of base 12, as seen in Fig. 1.

The bottom and top lengthwise stress members, 50 and 51 respectively, are each provided with lug 59 at each of its opposite ends. Framework element 60 fits around can 54 at one end of engine 18 to enclose it, and similar framework element 61 fits around can 55 to enclose it and the engine at the other end. Each of the framework elements 60 and 61 comprises several lengthwise members 64 and 65, bottom and top respectively. Each lengthwise member 64 and 65 is provided with a lug 62 at one of its ends, which is companion to a lug 59 of base 12, to which it is secured by a bolt 62.

Sets of transverse stress members 66, Fig. 1, laterally at top and bottom and upright at each side, are secured to each other end-to-end to form top and bottom corners on each side, the set of transverse members 66 for the several framework elements 60 and 61 respectively constituting the opposite ends of the crate. A lengthwise member 65, at its end remote from its lug 62, is secured to each top corner of transverse member 66, and similarly, each bottom corner of members 66 is secured to the end of a lengthwise member 64 remote from its lug 62.

Additional transverse stress members 67, located along lengthwise members 64 and 65 a distance away from transverse members 66, are secured, each at its both ends, to the lengthwise members of framework elements 60 and 61. This adds rigidity to the several framework elements 60 and 61, and locates the several lugs 62 in positions to engage each its companion lug 59 of base 12. Bottom lengthwise members of both framework elements 60 and 61 are shorter than their top lengthwise members 65, this length difference being coordinated with the length difference of lengthwise members in base 12, in which the bottom member 50 is longer than the top member 51, to square the ends of the crate embodied in the several stress members 66.

In the structure as described and shown, each bottom lengthwise member 50 of base 12 is positioned between the two bottom lengthwise members 64 of the several framework elements 60 and 61, and the three members are secured to each other rigidly end-to-end by means of their lugs 62 and 59 with their bolts 63. Similarly at the top, each lengthwise member 51 of base 12 is positioned between the two members 65 of the several framework elements 60 and 61, and the three members are secured to each other rigidly end-to-end by means of their lugs 62 and 59 with their bolts 63.

Framework elements 60 and 61 continuous with base 12, and secured to each other in the manner described, constitute a crate that encloses the container of cans 54 and 55 secured to band 11 with engine 18 inside, protecting the structure from blows that might strike in the normal handling of engine 18 for transportation.

The disclosed structure is one practical embodiment of the invention, the scope of which is determined by the accompanying claims.

We claim:

1. In a support for engines and the like, an endless band that fits around the engine, a base for the band and a mount for supporting the band on the base, the band comprising shackles spaced apart at circumferential intervals internally of the band to hold the band secured rigidly to the engine, each shackle comprising a fastener to engage the engine internally of the band, the several fasteners being located at intervals around the engine, the band, its shackles and their fasteners defining a plane of attachment between the engine normal to the axis of the band enabling the band to hold the engine in a plane normal to the lengthwise axis of gravity of the engine at its center of gravity, the mount comprising a plurality of shock absorbers attached to the band and to the base externally of the band and constituting the only stress connection between the band and the base, the several shock absorbers being spaced apart around the band and each being oriented to yield under shock load of the weight of the engine supported by the base, a shock absorber being positioned on each of respective opposite sides of the engine, each shock absorber comprising a torque arm pivoted at its one end on the base and extending from its pivot along side the engine, the several torque arms extending from their respective pivots in the same direction with reference to the lengthwise axis of the engine, a securing device for each torque arm at its end remote from its pivot and between the torque arm and the band at its corresponding side of the engine, the base comprising a bracket for each torque arm on which the torque arm bears at a point between its ends, a shock mount between each torque arm and its corresponding bracket at the point where the torque arm bears.

2. In a support as defined in claim 1, the shock absorbers constituting a plurality of shock absorbers on each side of the engine to comprise a set of torque arms symmetrically positioned respectively above and below the lengthwise axis of the engine.

3. In a support as defined in claim 1, the securing device between each torque arm and the band comprising a cylindrical buffer pad carried by the torque arm and extending in a direction lengthwise of the engine, a bolt extending through the buffer pad, and a support for the bolt secured to the band pivotally on an axis transverse to the axis of the cylindrical buffer pad.

4. In a support for engines and the like, an endless band that fits around the engine, a base for the band and a mount for supporting the band on the base, the band comprising shackles spaced apart at circumferential intervals internally of the band to hold the band secured rigidly to the engine, each shackle comprising a fastener to engage the engine internally of the band, the several fasteners being located at intervals around the engine, the band, its shackles and their fasteners defining a plane of attachment between the engine normal to the axis of the band enabling the band to hold the engine in a plane normal to the lengthwise axis of gravity of the engine at its center of gravity, the mount comprising a plurality of shock absorbers attached to the band and to the base externally of the band and constituting the only stress connection between the band and the base, the several shock absorbers being spaced apart around the band and each being oriented to yield under shock load of the weight of the engine supported by the base, a container for the engine comprising a can for each end of the engine that fits over the engine around its end, each can comprising a sealing flange around the rim of its open end, the band comprising a sealing flange at each of its ends, each flange of the band being a matching fit for the sealing flange of the can for its corresponding end of the engine.

5. In a support for engines and the like, an endless band that fits around the engine, a base for the band and a mount for supporting the band on the base, the band comprising shackles spaced apart at circumferential intervals internally of the band to hold the band secured rigidly to the engine, each shackle comprising a fastener to engage the engine internally of the band, the several fasteners being located at intervals around the engine, the band, its shackles and their fasteners defining a plane of attachment between the engine normal to the axis of the band enabling the band to hold the engine in a plane normal to the lengthwise axis of gravity of the engine at its center of gravity, the mount comprising a plurality of shock absorbers attached to the band and to the base externally of the band and constituting the only stress connection between the band and the base, the several shock absorbers being spaced apart around the band and each being oriented to yield under shock load of the weight of the engine supported by the base, the base comprising a framework of stress members secured to each other rigidly, the stress members including a set of transverse members at each end of the base positioned beyond the exterior periphery of the band and constituting lateral top and bottom members and upright side members secured to each other end-to-end to form top and bottom corners at each side, the stress members also including lengthwise members secured each at its ends to corresponding corners of the respective sets of transverse members, there being a lengthwise member for each of corresponding corners of the several sets of transverse members at the top and bottom on each side, the several lengthwise members connecting the opposite ends of the base to each other, the lengthwise stress members at the bottom being longer than at the top to extend the supporting area of the base.

6. In a support as defined in claim 5, a crate comprising a framework of stress members extending from the base around each end of the engine, the framework comprising a framework element secured to each of opposite ends of the base and consisting of transverse and lengthwise members secured to each other rigidly, transverse members of each framework element comprising lateral top and bottom members and upright side members secured to each other end-to-end to form top and bottom corners on each side, lengthwise members of each framework element comprising a member for each corner of the set of transverse members secured each at its one end to its corresponding corner and projecting therefrom to a position that locates its opposite end for engagement with the base, in each framework element the projecting end of each lengthwise member comprising a lug and each end of each lengthwise member of the base comprising a companion lug, corresponding lengthwise members of the base and the several framework elements being secured to each other end-to-end by companion lugs to constitute the crate for the engine consisting of the base and the framework attached thereto.

7. In a support for engines and the like, a band, a base and a mount for the band on the base, the band being large enough to fit around the engine and comprising internal shackles to engage the engine and secure it rigidly inside the band, the mount comprising a plurality of shock absorbers secured to and between the base and the band, and being secured to the band externally thereof, the mount constituting the only stress connection between the band and the base, the several shock absorbers being distributed spaced apart at intervals around the band with each shock absorber located and oriented to yield under shock load of the weight supported by the base, the base comprising a plurality of elongated stress members positioned beyond the peripheral contour of the band and secured to each other rigidly, the stress members severally comprising transverse members, lengthwise members and anchoring members for the shock absorbers, transverse members being located in sets at respective opposite ends of the base, each set of transverse members comprising lateral top and bottom members, and upright members at respective opposite sides of the engine, the transverse members of a set being secured to each other end-to-end at top and bottom corners on each of opposite sides of the engine, each of the lengthwise members being secured at each of its opposite ends to corresponding corners of the respective sets of lateral and upright members, the anchoring members being secured rigidly to the base in positions to locate the several shock absorbers in their desired positions with reference to the band, the shock absorbers being attached to the anchoring members to secure them to the base.

References Cited in the file of this patent

UNITED STATES PATENTS

| | | |
|---|---|---|
| 2,001,562 | Bagley | May 14, 1935 |
| 2,060,784 | Bent | Nov. 17, 1936 |
| 2,393,141 | Butterfield | Jan. 15, 1946 |
| 2,529,958 | Owner et al. | Nov. 14, 1950 |
| 2,549,906 | Johansson | Apr. 24, 1951 |
| 2,594,586 | Ries | Apr. 29, 1952 |
| 2,700,458 | Brown | Jan. 25, 1955 |